United States Patent
Su

(10) Patent No.: US 7,397,670 B2
(45) Date of Patent: Jul. 8, 2008

(54) POWER SUPPLY DEVICE, POWER SUPPLY MODULE AND RETRIEVAL POWER SUPPLY DEVICE EQUIPPED WITH AC AND DC CONNECTION STRUCTURES

(75) Inventor: Chun-Lung Su, Taipei Hsien (TW)

(73) Assignee: Zippy Technology Corp., Hsin Tien, Taipei Hsien (TW)

( * ) Notice: Subject to any disclaimer, the term of this patent is extended or adjusted under 35 U.S.C. 154(b) by 525 days.

(21) Appl. No.: 10/888,975

(22) Filed: Jul. 13, 2004

(65) Prior Publication Data

US 2006/0013027 A1   Jan. 19, 2006

(51) Int. Cl.
*H05K 7/14* (2006.01)

(52) U.S. Cl. .............. 361/752; 361/730; 361/796; 361/728; 174/520

(58) Field of Classification Search .......... 361/679, 361/728–730, 748, 788, 796, 686, 826, 736, 361/752, 797; 174/50, 520

See application file for complete search history.

(56) References Cited

U.S. PATENT DOCUMENTS

| | | | | | |
|---|---|---|---|---|---|
| 2,922,081 | A | * | 1/1960 | Dubin | 361/725 |
| 5,737,194 | A | * | 4/1998 | Hopkins et al. | 361/800 |
| 5,940,288 | A | * | 8/1999 | Kociecki | 363/144 |
| 6,293,828 | B1 | * | 9/2001 | Colver et al. | 439/680 |
| 6,392,872 | B1 | * | 5/2002 | Doustou et al. | 361/681 |
| 6,392,901 | B1 | * | 5/2002 | Colver et al. | 361/826 |
| 6,693,371 | B2 | * | 2/2004 | Ziegler et al. | 307/64 |

* cited by examiner

*Primary Examiner*—Dean A. Reichard
*Assistant Examiner*—Dameon E Levi
(74) *Attorney, Agent, or Firm*—Muncy, Geissler, Olds & Lowe, PLLC

(57) ABSTRACT

A power supply device equipped with AC and DC power supply structures aims to separate an AC connection structure and a DC connection structure of the power supply device of a given size specification to replace the conventional DC and AC connection structures that are coupled on a single connection board so that the DC connection board may be extended to the maximum width of the power supply device specification to increase output legs and maximize the output power of the power supply device.

3 Claims, 5 Drawing Sheets

US 7,397,670 B2

POWER SUPPLY DEVICE, POWER SUPPLY MODULE AND RETRIEVAL POWER SUPPLY DEVICE EQUIPPED WITH AC AND DC CONNECTION STRUCTURES

FIELD OF THE INVENTION

The present invention relates to a power supply device equipped with AC and DC power connection structures and particularly to a power supply device for processing AC and DC electricity to deliver maximum output power.

BACKGROUND OF THE INVENTION

In response to the increasing requirements of the Internet, multimedia and the like, computer technology has great advances. The required hardware structures such as hard disk drives, optical disk drives, burners have become basic equipment of users or server operators. The required output power provided by the power supply device also has to increase at the same time. The basic power of 250 W in the past no longer meets the requirements. These days the computer hardware equipment often requires 450 W, 500 W or 600 W of output power.

However, the prevailing trend of hardware design at present is to maintain the function of the large equipment at a shrinking size. The power supply also has to follow this trend. This causes problems in the design of power supply devices. For instance, for the power supply device used in the common 1U specification, the maximum width is 100 mm, and the electric connection board for AC and DC output and input has a width of 92 mm. Due to the present technique is to wire the AC input and DC output on a single circuit board on which AC input legs occupy 22 mm. The remained 70 mm is for DC output. However, convert the power to output legs, every 100 W of power needs 15 mm. With the present 1U specification, the maximum power supply output is 450 W. It becomes a capacity constraint. As the present server space requires at least 500 W of power supply, or at least 75 mm for the DC output legs. The present technique cannot meet this requirement. To change the width or space design of the server is difficult. Hence this is an important technical issue pending to be resolved in the power supply industry.

SUMMARY OF THE INVENTION

The primary object of the present invention is to solve the aforesaid disadvantages. The present invention aims to divide a power supply device to an AC connection structure and a DC connection structure under the specification of the same size to replace the conventional design that couples the AC connection structure and the DC connection structure to one connection board so that the output legs of the DC connection board may be expanded to the maximum width of the power supply device to achieve maximum output power.

Another object of the invention is to provide a design that is applicable to a power supply device, a power supply module and a retrieval power supply device at the same time to achieve optimal economic effectiveness.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENTS

Figure 1:
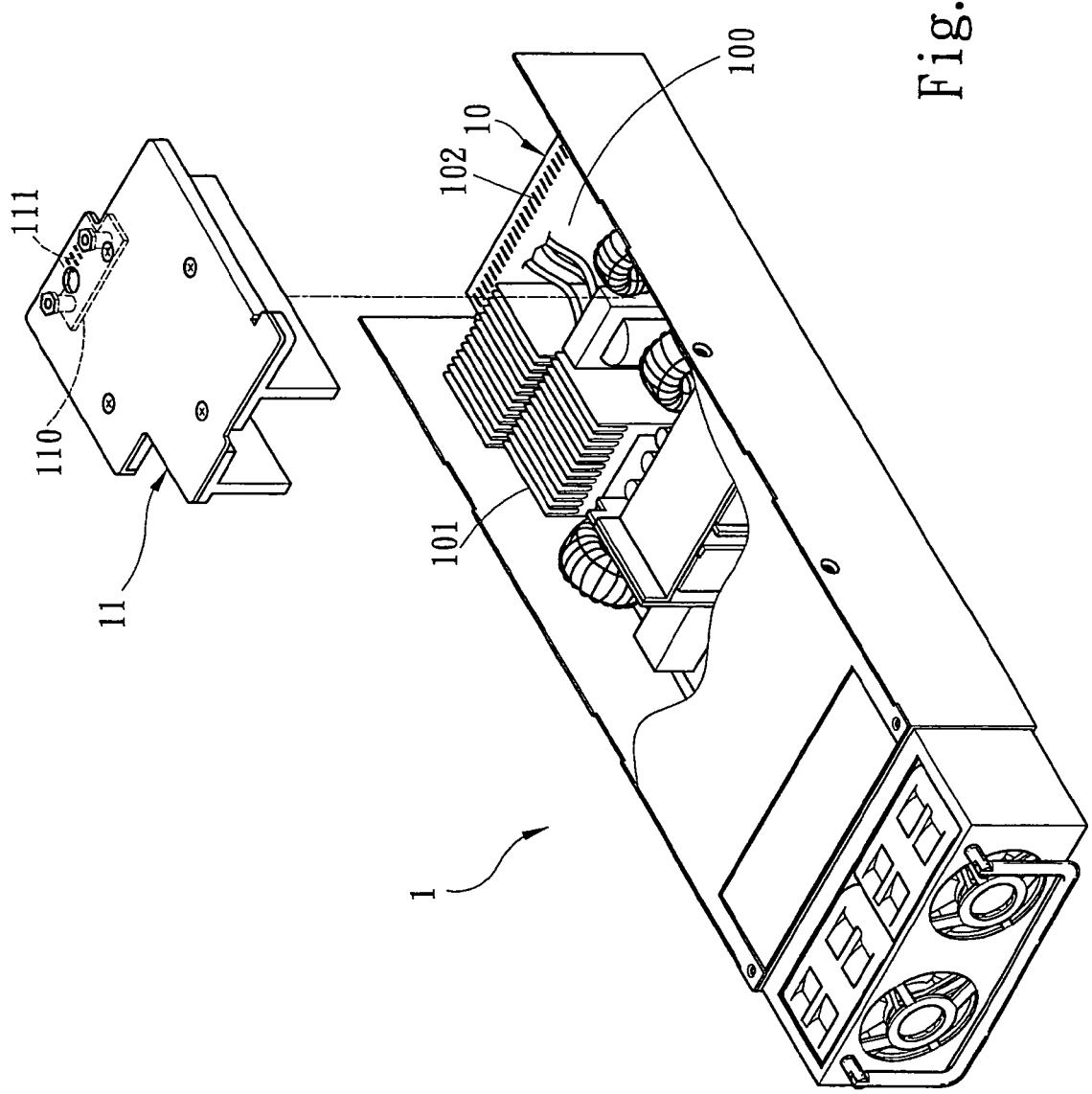
FIG. 1 is a perspective view of the present invention adopted for use on a single power supply device.

Please refer to FIG. 1 for a power supply device 1 that has an AC connection structure 11 and a DC connection structure 10 located therein separately to replace the conventional connection structure that mixes the AC and DC power supply on a same connection structure. The DC connection structure 10 includes a main circuit board 100 and an electric processing unit 101 located on the main circuit board 100. The main circuit board 100 has a DC connection end 102. The AC connection structure 11 includes a secondary circuit board 110 electrically connecting to the DC structure that has an AC connection end 111. The power supply device 1 in the embodiment is adopted to the commonly used 1U specification as an example, and has a standard width of 100 mm in the present standard specification. Due to the AC connection structure 11 is located individually on the secondary circuit board 110 on a upper side of the power supply device 1, the main circuit board 100 of the DC power structure 10 may be fully expanded to the entire width of the power supply device 1. Hence the DC connection end 102 on the width of 92 mm can have output legs with maximum power capacity up to 600 W. Such a power output is sufficient to meet the requirements of many hardware equipment. Therefore it provides the economic effectiveness of delivering the performance of a large power supply at a smaller size.

Figure 2:
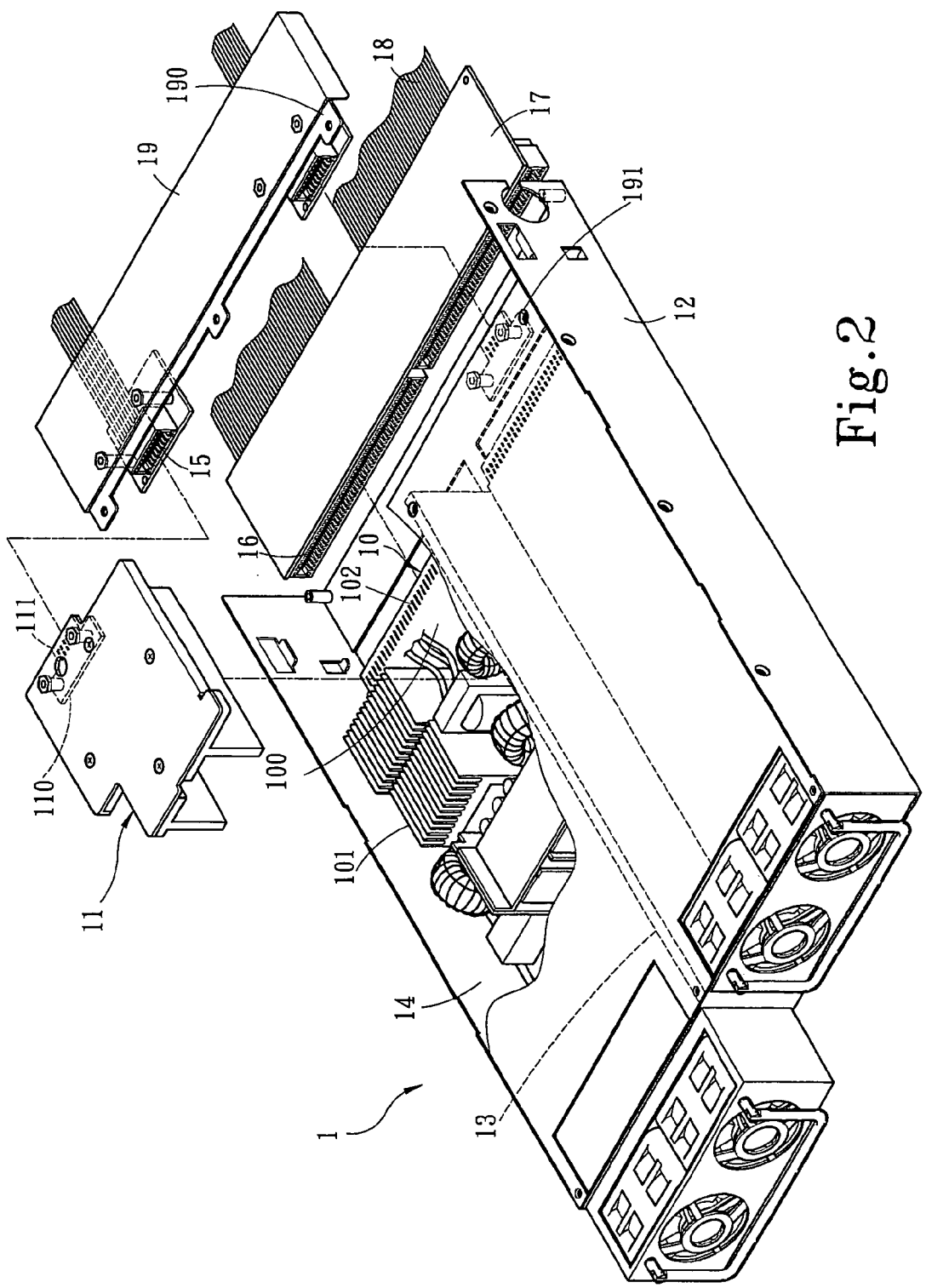
FIG. 2 is a perspective view of the present invention adopted for use on a horizontal retrieval power supply device.

Refer to FIG. 2 for another embodiment of the invention that has one single power supply device 1 serving as a retrieval power supply device 1 for backup purpose. The retrieval power supply device 1 is a horizontal type to serve as an example. It is located in one of a plurality of housing compartments 14 formed by dividing a case 12 by partitions 13. The case 12 has one end corresponding to each housing compartment 14 to couple with an AC connection port 15 and a DC connection port 16 that are coupled on an electric connection board 17. The electric connection board 17 is connected to cables 18 which are extended outside the case 12 to deliver electric power. The power supply device 1 has an AC connection end 111 and a DC connection end 102 corresponding respectively to the AC connection port 15 and the DC connection port 16. Hence with the power supply device 1 is installed in the housing compartment 14 of the case 12, the AC connection end 111 can be coupled with the AC connection port 15 and the DC connection end 102 can be coupled with the DC connection port 16 to establish electric connection. Therefore each power supply device 1 can deliver maximum power output. When the power supply device 1 is coupled in parallel, output power may be multiplied to meet the requirements of various types of hardware equipment. When adopted for backup purpose, each power supply device 1 can deliver maximum output power to meet the computer hardware requirement.

Figure 3:
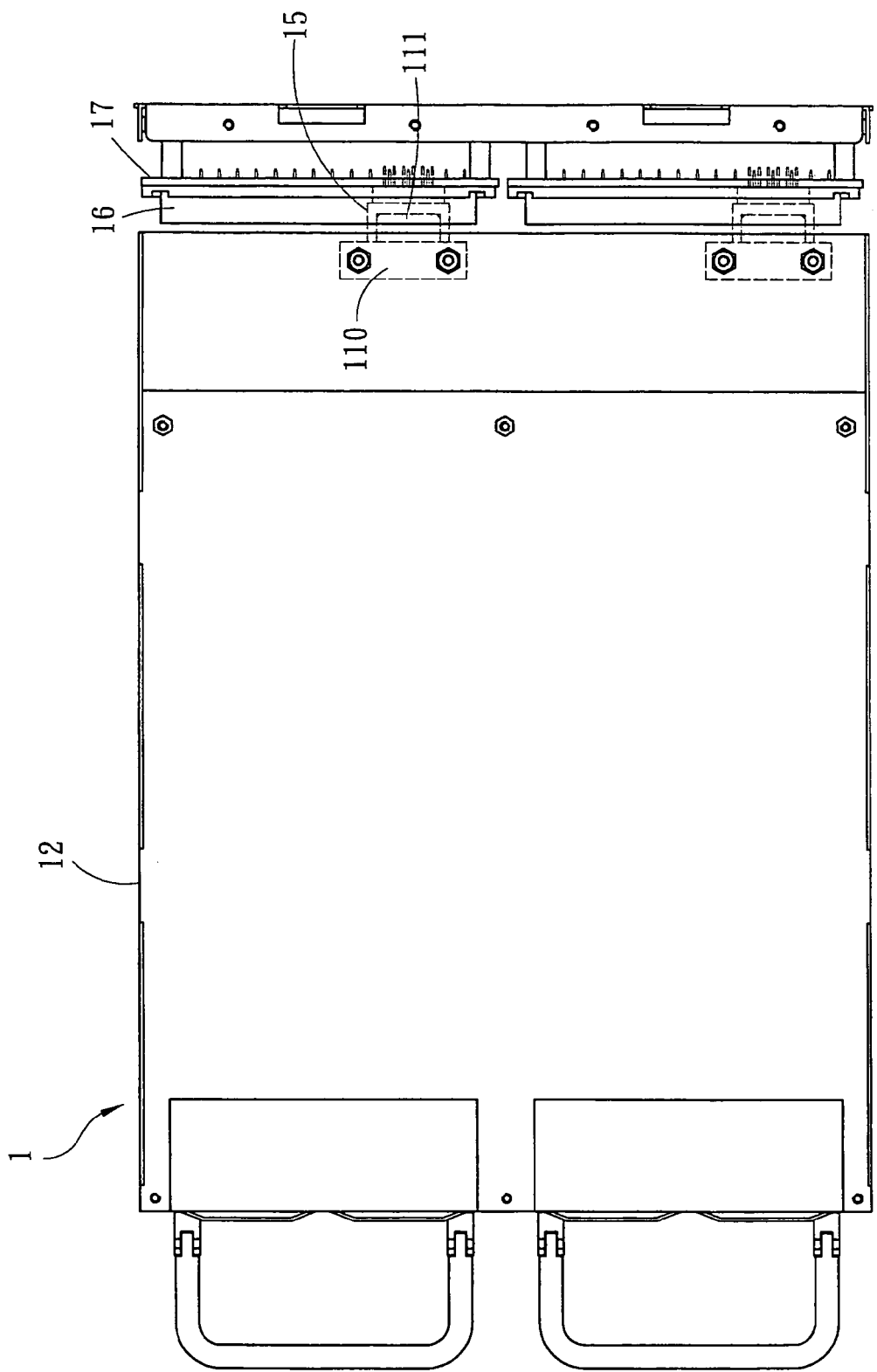
FIG. 3 is a top view of the present invention adopted for use on a stacked retrieval power supply device.
Figure 4:
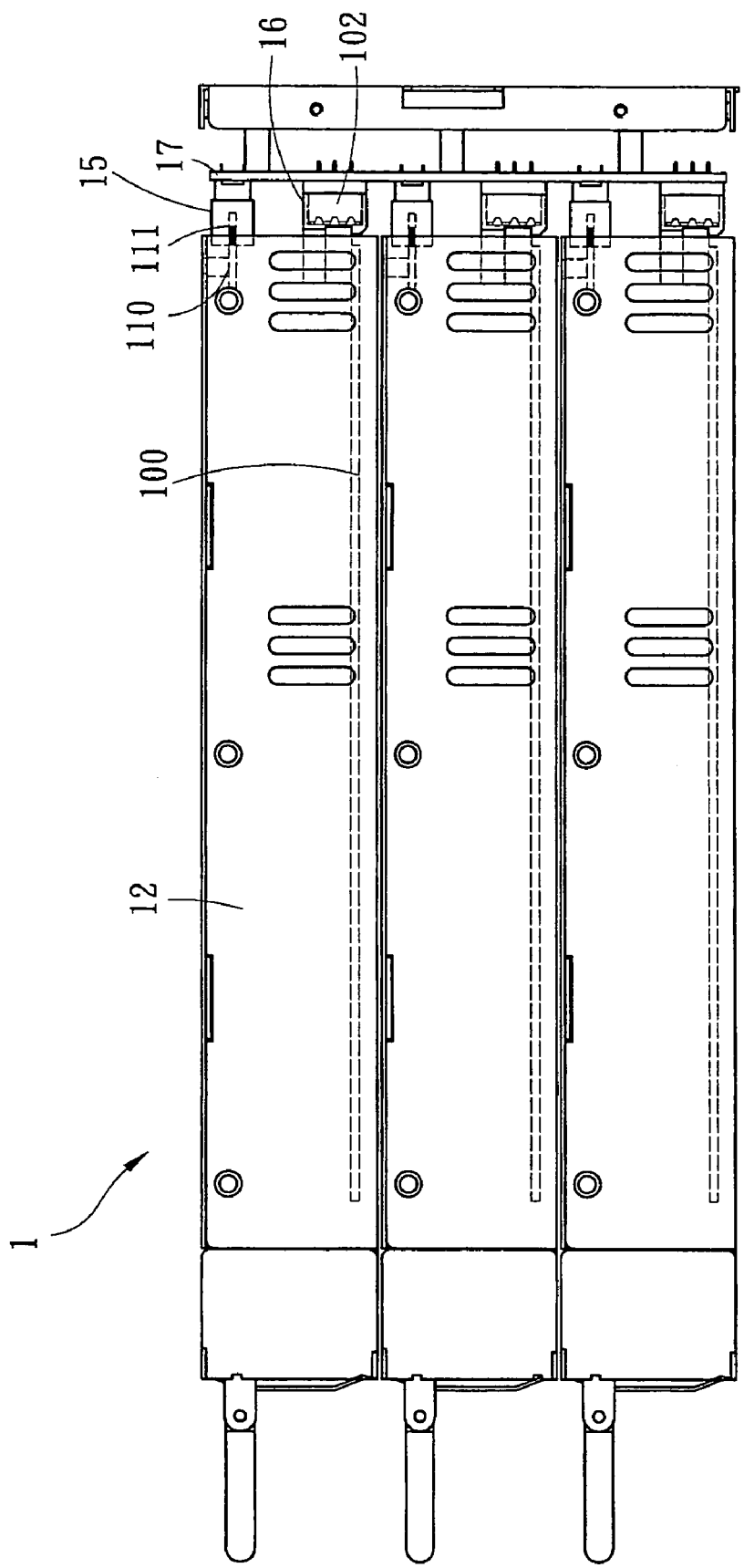
FIG. 4 is a side view of the present invention adopted for use on a stacked retrieval power supply device.
Figure 5:
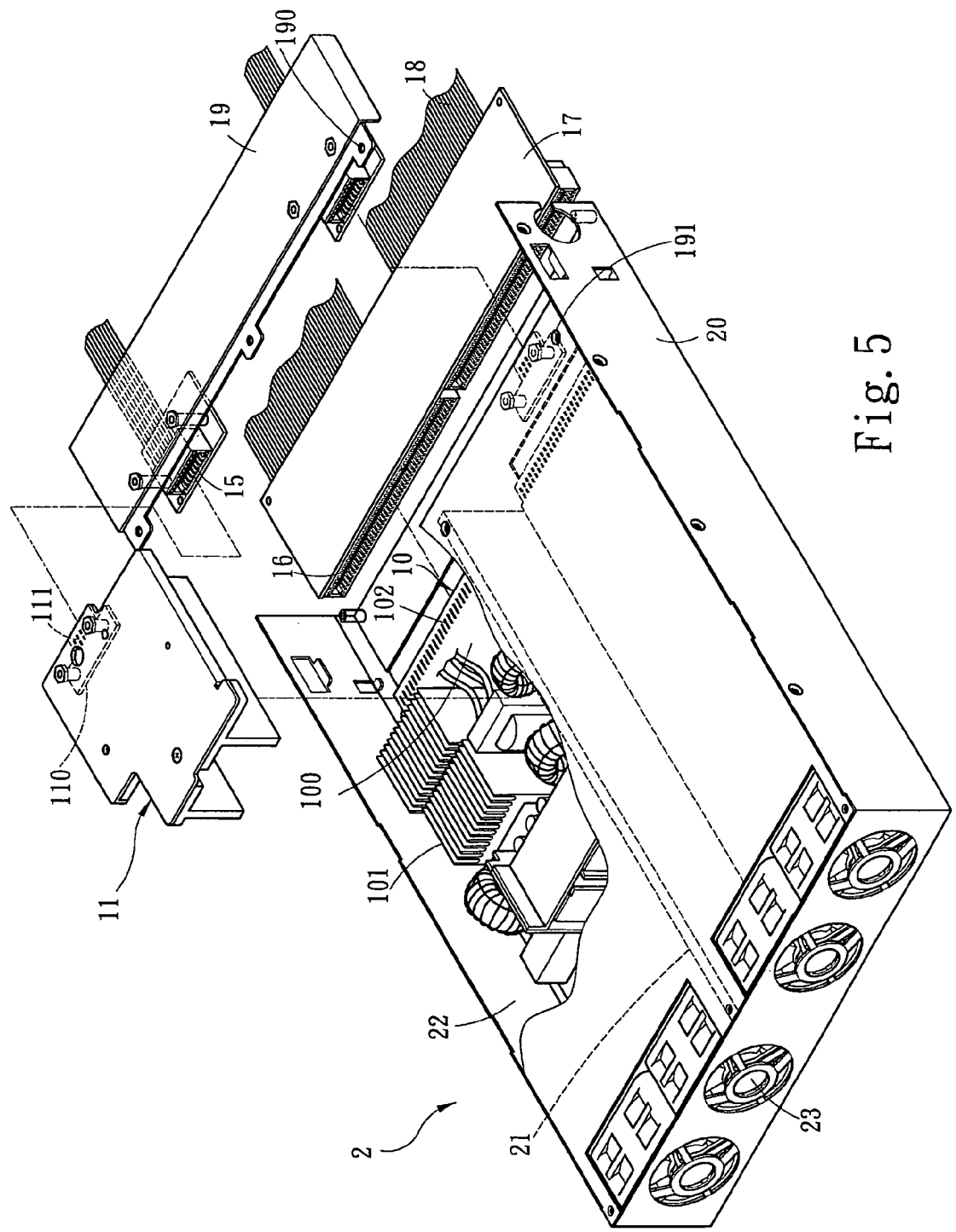
FIG. 5 is a perspective view of the present invention adopted for use on a power supply module.

Refer to FIGS. 3 and 4 for yet another embodiment of the invention. It adopts a technique similar to that shown in FIG. 2. The difference is that the AC connection port 15 and the DC connection port 16 are jointly located on an electric connection board 17, and the power supply device 1 is installed by stacking. Other details are same as previously discussed. Refer to FIG. 5 for an embodiment of a power supply module 2 that includes a plurality of electric processing units 101. A case 20 is divided into at least two housing compartments 22 by partitions 21 corresponding to the number of the electric processing units 101. One end of the case 20 corresponding to each housing compartment 22 is coupled with an AC connection port 15 and a DC connection port 16. Each electric processing module consists of a main circuit board 100 and one electric processing unit 101. On the main circuit board 100, there is a DC connection end 102 corresponding to the DC connection port 16. On the upper side of each housing compartment 22, there is a secondary circuit board 110 which has an AC connection end 111 corresponding to the AC connection port 15. The secondary circuit board 110 is electrically connected to the electric processing module. The AC connection port 15 and the DC connection port 16 are individually located on an electric connection board 17 (or jointly located on the electric connection board 17). The connection board 17 is connected to cables 18 which are extended outside the case 20 to deliver electric power. Such a structure allows multiple modules to be installed simultaneously and makes installation easier. The case 20 may have a separated anchor board 19 to install the AC connection port 15 and the DC connection port 16. The anchor board 19 and the case 20 have respectively an anchor lug 190 and an anchor hole 191. After the main circuit board 100, secondary circuit board 110 and radiation fans 23 are installed in the housing compartment 22, wedge the anchor board 19 in the case 20 to align and fasten the anchor lug 190 to the anchor hole 191, then the AC and DC connection end 111, 102 and the AC and DC connection port 15, 16 may be connected electrically. Thus in the existing width of the present specification, the DC connection end 102 may be fully expanded to the width of the housing compartment 22 to maximize the output power of the power supply module 2.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A power supply module equipped with AC and DC power connection structures, comprising:
    a case having at least two housing compartments formed by partitions and one end corresponding to each housing compartment coupled to an AC connection port and a DC connection port;
    at least two electric processing modules located respectively in the housing compartments, each electric processing module including a main circuit board and an electric processing module, the main circuit board having a DC connection end corresponding to the DC connection port; and
    at least two secondary circuit boards located individually in the housing compartment, each secondary circuit board having an AC connection end corresponding and connecting to the AC connection port, the secondary circuit board being electrically connected to the electric processing module;
    wherein the case has a separated anchor board for coupling the AC connection port and the DC connection port, the anchor board having an anchor lug, the case having an anchor hole.

2. The power supply module of claim 1, wherein the AC connection port and the DC connection port are individually located on an electric connection board which is connected to cables that are extended outside the case to deliver electric power.

3. The retrieval power supply module of claim 1, wherein the AC connection port and the DC connection port are jointly located on an electric connection board which is connected to cables that are extended outside the case to deliver electric power.

* * * * *